United States Patent
Brunet et al.

(10) Patent No.: US 8,052,381 B2
(45) Date of Patent: Nov. 8, 2011

(54) TURBOMACHINE MODULE PROVIDED WITH A DEVICE TO IMPROVE RADIAL CLEARANCES

(75) Inventors: Antoine Robert Alain Brunet, Moissy Cramayel (FR); Claude Chomel, Maisse (FR); Sebastien Juste, Saint Fargeau Ponthierry (FR); Emmanuel Houradou, Paris (FR); Dominique Raulin, Saint Fargeau Ponthierry (FR); Frederic Renault, Ballancourt (FR); Julien Sedlak, Paris (FR)

(73) Assignee: SNECMA, Paris (FR)

( * ) Notice: Subject to any disclaimer, the term of this patent is extended or adjusted under 35 U.S.C. 154(b) by 551 days.

(21) Appl. No.: 12/333,478

(22) Filed: Dec. 12, 2008

(65) Prior Publication Data

US 2009/0202341 A1 Aug. 13, 2009

(30) Foreign Application Priority Data

Dec. 14, 2007 (FR) .................................. 07 08709

(51) Int. Cl.
*F01D 25/08* (2006.01)
*F04D 29/58* (2006.01)
(52) U.S. Cl. ........................ 415/177; 415/119
(58) Field of Classification Search ............ 415/173.1, 415/173.3, 144, 28, 108, 169.1, 175, 176, 415/119, 177; 60/782, 785, 795
See application file for complete search history.

(56) References Cited

U.S. PATENT DOCUMENTS

| 4,642,027 A | * | 2/1987 | Popp | 415/177 |
| 5,160,241 A | * | 11/1992 | Glynn | 415/175 |
| 5,330,321 A | | 7/1994 | Roberts et al. | |
| 6,035,929 A | | 3/2000 | Friedel et al. | |
| 7,197,882 B2 | * | 4/2007 | Marnas et al. | 60/796 |
| 7,249,929 B2 | * | 7/2007 | Cummings et al. | 415/144 |
| 7,409,831 B2 | * | 8/2008 | Lepretre | 60/785 |
| 2004/0033133 A1 | * | 2/2004 | Muny | 415/175 |

FOREIGN PATENT DOCUMENTS

GB 2 388 407 A 11/2003

* cited by examiner

*Primary Examiner* — Caridad Everhart
(74) *Attorney, Agent, or Firm* — Oblon, Spivak, McClelland, Maier & Neustadt, L.L.P.

(57) ABSTRACT

The invention relates to a turbomachine module comprising a device to improve radial clearances, comprising an outer casing (22), an inner casing (21) and at least one shock absorbing ring (5) connecting the casings, the module also comprising an annular cavity (43) on the downstream side of the ring (5), with a passage (42) formed in it through which an airflow (4) is drawn off from the primary flow (Fp). According to the invention, the device to improve radial clearances comprises a thermal inertia control device for the shock absorbing ring mounted on the shock absorbing ring (5), downstream from it, this device comprising at least one coat of thermal insulation (8), and at least partly delimiting the annular cavity (43) on the downstream side of it (43).

14 Claims, 7 Drawing Sheets

TURBOMACHINE MODULE PROVIDED WITH A DEVICE TO IMPROVE RADIAL CLEARANCES

This invention relates to a turbomachine module comprising a device to improve radial clearances. The invention is applicable to turbomachines, and particularly aircraft turbojets and aircraft turboprops.

A turbomachine is generally composed of a set of three modules: a compressor module, a chamber module and a turbine module. The compressor module compresses an airflow passing through the compressor from the upstream side to the downstream side of the turbomachine. The turbine module expands a compressed airflow passing through the turbine from the upstream side to the downstream side of the turbomachine and transmits power retrieved by expansion of gases to the compressor. The compressor module and the turbine module are composed of a rotor, an inner casing and an outer casing surrounding the inner casing. The rotor comprises at least a disk provided with a plurality of blades distributed around the circumference. Shells are placed facing the blades and are assembled to build up the inner casing of the compressor. The inner casing is connected to a fixed outer shell forming the outer casing through one or several shock absorbing rings.

The vertex of a mobile blade of a rotor disk is separated from the facing inner casing shell by a radial clearance. The radial clearance must be kept as small as possible to improve performances of the turbomachine. However, during operation and particularly during the change between the different turbomachine operating conditions, the radial clearance varies due to differences in thermal expansion firstly between the rotor and the inner casing, and secondly between the inner and outer casings, and particularly due to the difference in expansion rates of the shock absorbing rings relative to the inner and outer casings. The masses of the shock absorbing rings are much smaller than the inner and the outer casings, to avoid increasing the mass of the turbomachine. Therefore the thermal inertia of these shock absorbing rings is much lower than the inertia of the casings, and this can cause modifications to the position of the inner casing and an increase or a reduction in the radial clearances between the mobile blades and the inner casing. The result of a variation in these radial clearances reduces the efficiency of the turbomachine and it causes wear to the vertices of the blades and the surface of the shells.

Devices to improve the radial clearances of a turbomachine are known in prior art, particularly in documents U.S. Pat. Nos. 5,330,321, 6,035,929 and GB 2 388 407. However, all these devices are active clearance control devices, which means that they cannot operate unless part of the airflow entering into the turbomachine is drawn off. However drawing off of air reduces the efficiency of the turbomachine because it reduces the air quantity at the output from the compressor. Furthermore, these devices require particular arrangements to the turbomachine by adding large volume parts and/or by adding parts that are difficult to make industrially.

The purpose of this invention is to overcome the disadvantages described above and to make a turbomachine module provided with a device to improve radial clearances that is easy to implement, does not require any major structural modification, does not necessitate drawing off an airflow or the addition of any complex parts, to enable local action close to the radial clearances and to locally reduce undesirable effects due to excessively fast expansion of the shock absorbing ring relative to the rotor disk blades, by harmonising response times and displacement amplitudes of the inner casing relative to the rotor.

To achieve this, the invention provides a turbomachine module provided with a device to improve radial clearances comprising an outer casing, an inner casing through which a primary turbomachine flow passes, and at least one shock absorbing ring connecting said casings, said module also comprising an annular cavity on the downstream side of said shock absorbing ring, with a passage formed in it through which an airflow from said primary flow is drawn off. According to the invention, the device to improve radial clearances comprises a thermal inertia control device for the shock absorbing ring mounted on the shock absorbing ring, downstream from it, this thermal inertia control device comprising at least one coat of thermal insulation, and delimiting at least said annular cavity partly on the downstream side of it.

Advantageously, particularly due to the thermal insulating layer, the invention can increase the time necessary for the temperature of the shock absorbing ring to change, and therefore harmonising the expansion rate of the shock absorbing ring to match the expansion rates of the inner casing and the outer casing.

Preferably, the coat of thermal insulation is in contact with an inner surface of an annular arm inside the shock absorbing ring.

Advantageously, the thermal inertial control device also comprises a cover plate mounted on an annular arm inside the shock absorbing ring and a cavity located between the cover plate and the inner arm, the layer of thermal insulation being housed in the cavity.

Alternately, the thermal insulation layer is a thermal coat deposited on the inner surface of the inner arm of the shock absorbing ring.

The invention also relates to use of the turbomachine module described above at the turbomachine compressor or at the turbomachine turbine.

Finally, another purpose of the invention is a turbomachine comprising at least one module like that described above.

Figure 1:
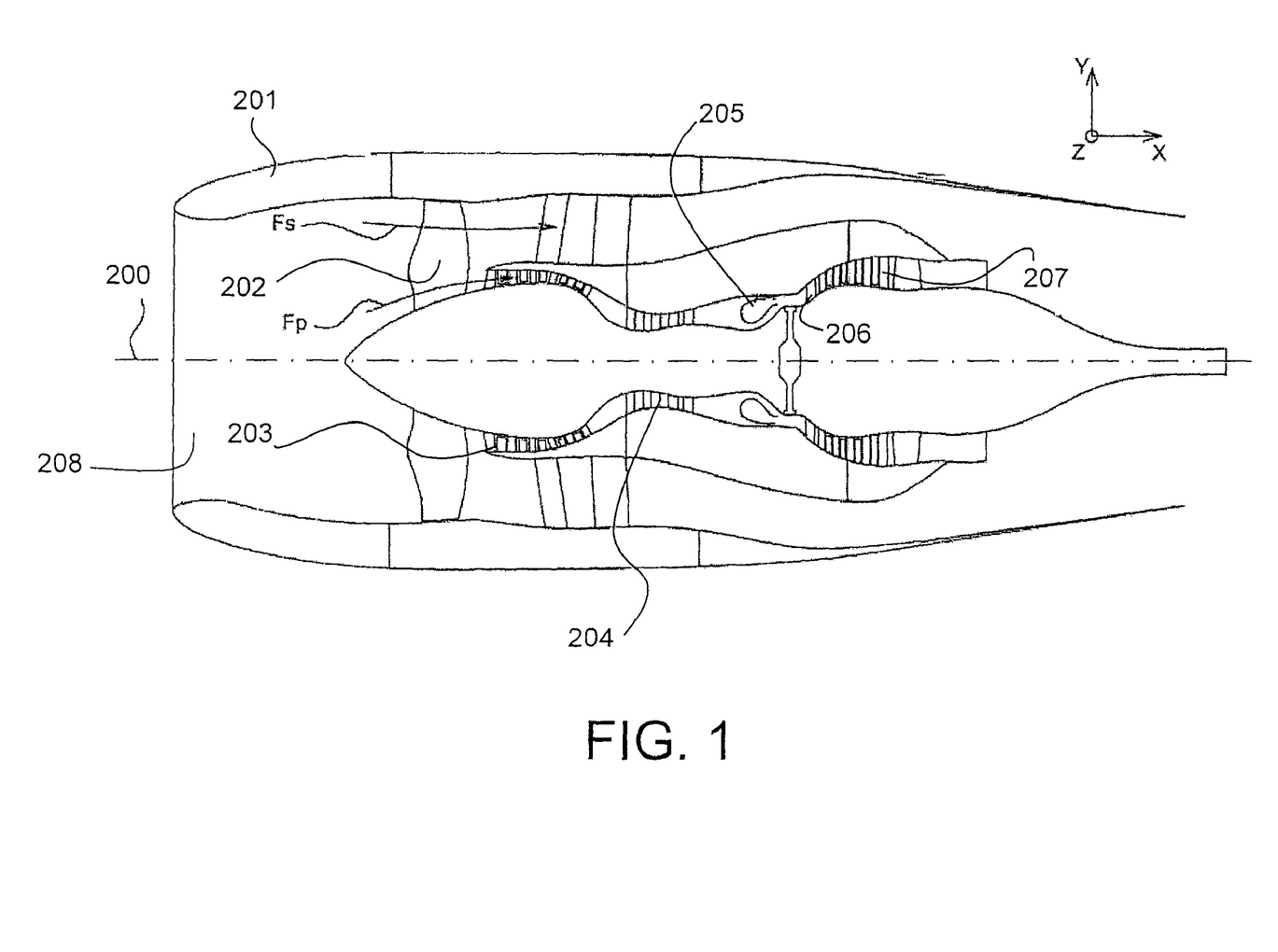
FIG. 1 shows an axial sectional view of an example of a turbomachine according to prior art.

The invention will be better understood and its advantages will become clearer after reading the detailed description given below as a non-limitative example and with reference to the appended figures that represent the following:

FIG. 1 illustrates an example of a turbomachine integrated into a pod 201 surrounding the turbomachine. The turbomachine comprises the following from the upstream to downstream side:

an air inlet 208, a fan 202 comprising a plurality of blades mounted on a first rotor disk, a low pressure compressor 203 comprising at least one bladed rotor and a stator, a high pressure compressor 204 comprising at least one bladed rotor and a stator, a combustion chamber 205, a high pressure turbine 206 comprising at least one bladed rotor and a stator, a low pressure turbine 207 comprising at least one bladed rotor and a stator.

The centreline 200 is the centreline of rotation of the turbomachine.

In the example turbomachine shown, outside air enters through the air inlet 208 and passes through the fan blades 202. At the outlet from the fan blades, the airflow is divided into two flows. A first flow called the primary flow Fp is directed towards the inlet of the low pressure compressor 203 and a second flow called the secondary flow Fs directed towards the back of the turbomachine. The low pressure compressor 203 compresses the primary airflow Fp a first time and then directs it towards the high pressure compressor 204. The high pressure compressor compresses the primary flow Fp a second time before insufflating it into the combustion chamber 205. A part of the primary flow Fp passing through the high pressure compressor is drawn off for air needs of the turbomachine but also for compressed air needs of the aircraft.

In the combustion chamber 205, the primary flow Fp is heated to a very high temperature. At the output from the combustion chamber 205, the hot airflow is injected into the high pressure turbine 206 and then into the low pressure turbine 207 that transform the expansion of hot gases into mechanical energy. The power recovered by the high pressure turbine 206 drives the high pressure compressor 204 through a first axial shaft. The low pressure turbine 207 rotates the low pressure compressor 203 and the fan blades 202 through a second axial shaft concentric with the first shaft.

Figure 2:
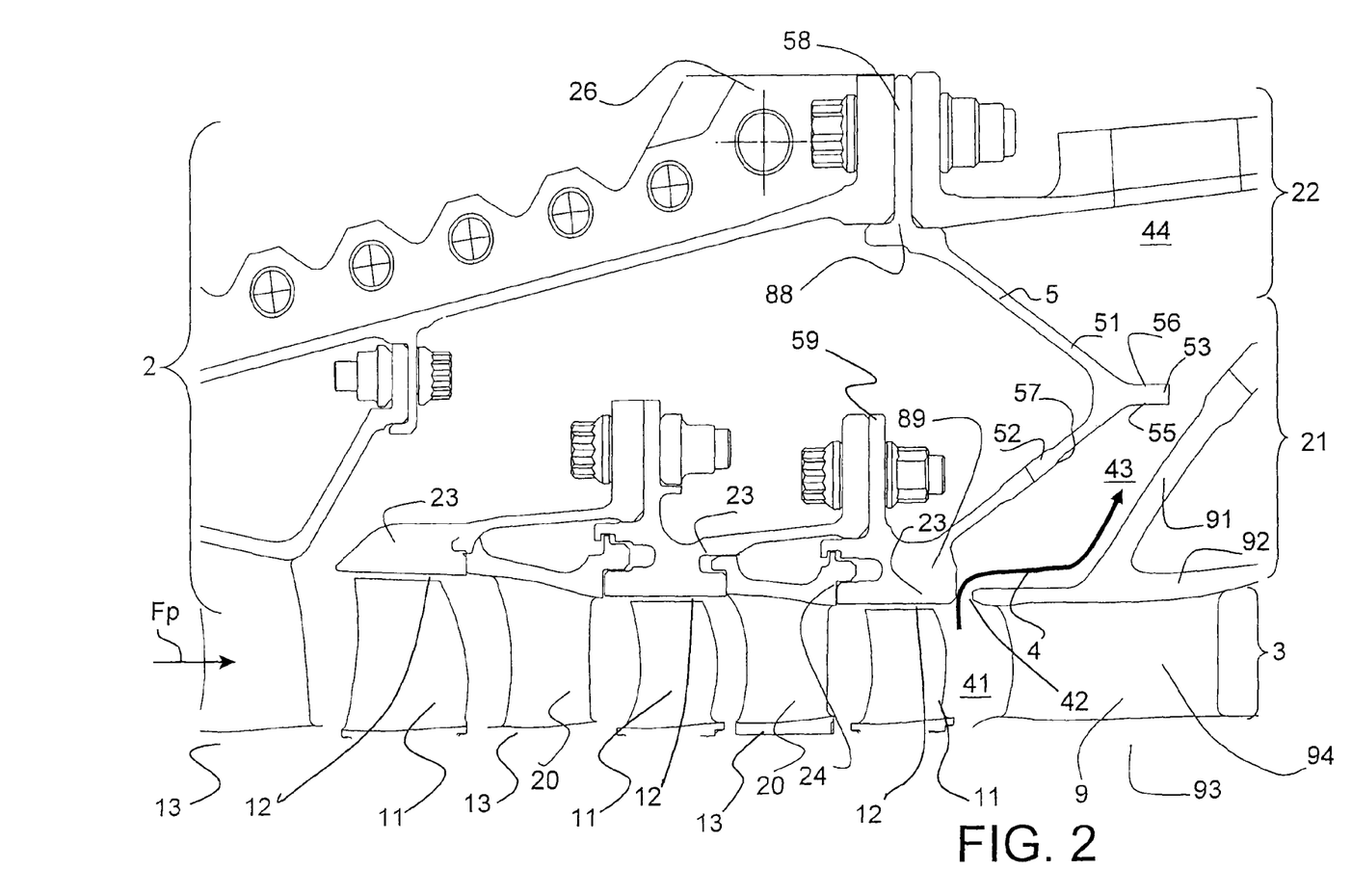
FIG. 2 shows an axial sectional view of an example of a turbomachine compressor according to prior art.

FIG. 2 show an axial sectional view of an example of compressor according to prior art. The compressor comprises a rotary assembly or rotor 3 comprising a plurality of disks each provided with a plurality of blades 11 distributed around the circumference and at the periphery of each disk.

The compressor also comprises a fixed assembly or stator 2 comprising a plurality of fixed guide vanes 20. Each guide vane is composed of a plurality of fixed blades 20 fixed at a lower end to an annular inner shell 13 and at an upper end to an annular outer shell 24. The outer shells 24 are connected to each other by the rings 23 comprising a thermally insulating and abradable coating. The set of outer shells 24 in the different guide vanes and the abradable rings 23 forms the inner casing 21 of the compressor.

The stator 2 also comprises an outer casing 22 composed of a set of outer annular shells 26.

The vertices of the blades 11 of the rotor 3 are spaced from the abradable ring 23 facing them by radial clearances 12.

The inner casing 21, through which the primary flow Fp that it radially delimits on the outside passes, is connected to the outer casing 22 by at least one shock absorbing ring 5. In this example, the shock absorbing ring 5 is composed of an annular pin with two ends, namely the upper end 88 and the lower end 89, an annular outer arm 51, an annular inner arm 52 and a cylindrical stiffener leg 53. The inner arm 52 and outer arm 51 are connected to each other so as to form a V or a U, in which the tip is facing the downstream side of the compressor. In this respect, note that the term downstream should be considered relative to a general flow direction of gas through the turbomachine. The cylindrical stiffener leg 53 comprising an inner face 55 and an outer face 56 is located along the extension of the two inner and outer arms fixed to the junction of the inner and outer arms. The outer arm 51 of the shock absorbing ring 5 is connected to the outer casing by a first annular flange 58. The inner arm 52 of the shock absorbing ring 5 is connected to the outer shells 24 of the inner casing by a second annular flange 59.

On the example shown in FIG. 2, the flanges 58 and 59 are fixed to the upper end 88 and the lower end 89 of the shock absorbing ring. The flange 59 is also fixed to one of the rings 28 that enables the shock absorbing ring 5 to be connected to the other shells in the inner casing 21.

There is a diffuser 9 on the downstream side of the inner casing 21 that has the purpose of directing the primary flow Fp output from the compressor towards the combustion chamber. The diffuser 9 is a fixed annular part composed of a plurality of blades 94 connected to each other by an inner diffuser shell 93 and by an outer diffuser shell 92. The diffuser 9 is connected to the outer casing 22 through an annular arm 91. The inner casing 21 is spaced from the outer shell 92 of the diffuser by an axial clearance called the passage 42. This clearance 42 enables the passage of an airflow 4 drawn off from the primary flow Fp through the cavity 41 located between the compressor and the diffuser. Furthermore, the space between the inner arm 52 of the shock absorbing ring and the arms 91 of the diffuser 9 forms an annular cavity 43 through which the airflow 4 passes.

The airflow 4 is air drawn off for various needs such as de-icing of aircraft wings or cooling of some turbomachine components. The airflow 4 is drawn off in the cavity 41 and then opens up into the cavity 43 and comes into contact with the inner face 57 of the inner arm 52 of the shock absorbing ring 5 and warms it up or cools it down. This flow then opens up into an annular cavity 44 located between the outer arm 51 of the shock absorbing ring 5 and the outer casing 22.

Figure 3A:
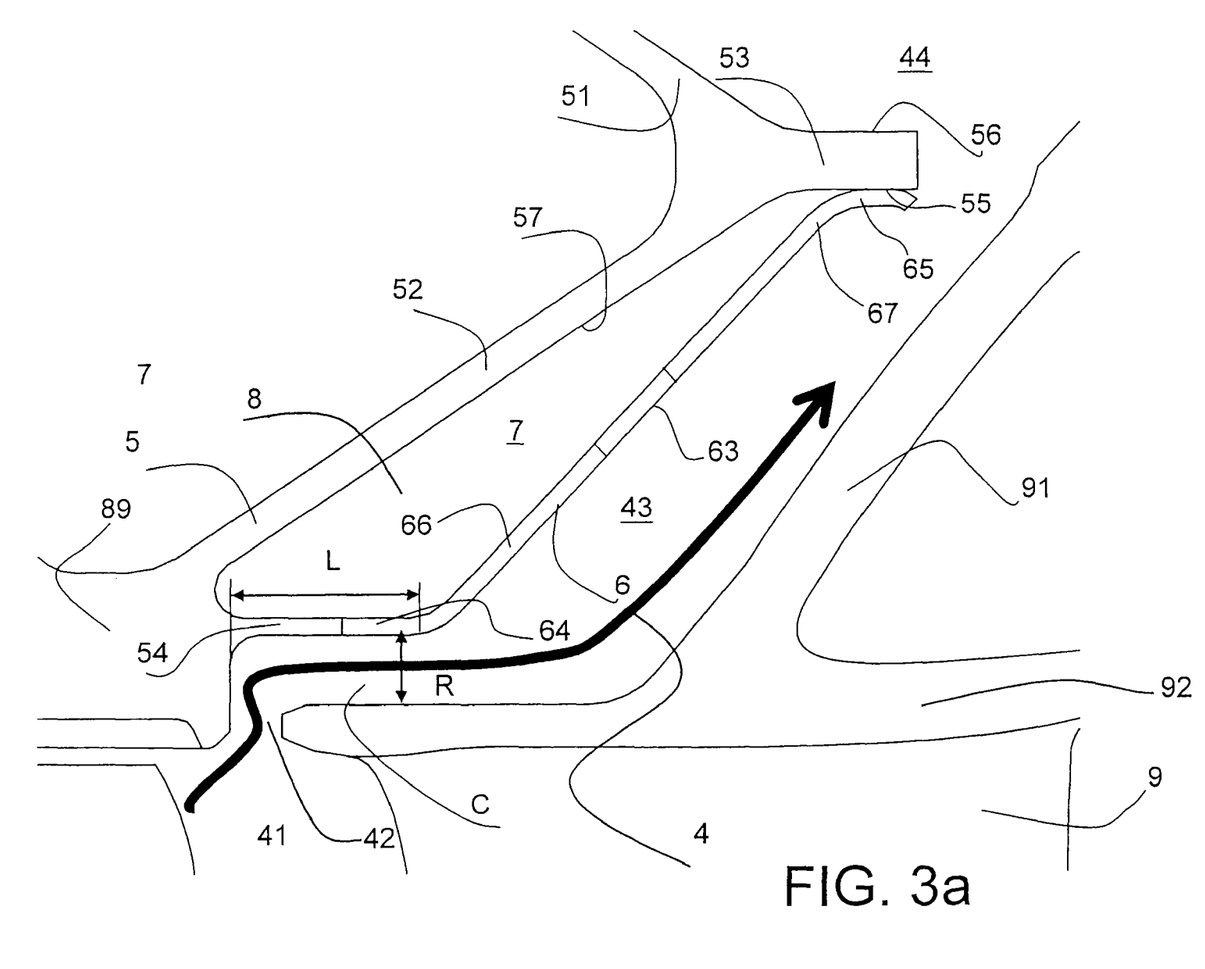
FIGS. 3a, 3b, 3c show axial sectional views of a first embodiment of the invention.

FIG. 3a shows a detailed view of a first embodiment of the invention. According to this first embodiment of the invention, the shock absorbing ring 5 is equipped with a device for controlling its thermal inertia preferably placed in contact with and on the downstream side of the inner surface 57 of its inner arm 52, facing the outer shell 92 and the annular arm 91 of the diffuser 9. The thermal inertia control device comprises a layer of thermal insulation 8 in contact with the inner arm 52 of the shock absorbing ring 5, and arranged on the downstream side of this arm. The thermal energy control device also comprises an annular cover plate 6 comprising an upstream end 64 and a downstream end 65 connected to the lower end 89 of the shock absorbing ring 5, and to the stiffener leg 53 of the shock absorbing ring 5, respectively.

The annular cover plate 6, placed on the downstream side of the inner arm 52, thus covers the inner face 57 of this arm 52, leaving a space so as to create an annular cavity 7 between them. The cavity 7 is filled with at least one thermal insulating material 8 for example such as air, glass fibre, silica wool felt or any other material known for its thermal insulation properties, so as to form said thermal insulation layer. The cover plate 6 keeps the insulating material in position. The cover plate 6 is provided with a single opening 63 that enables hot air output from the airflow 4 to fill the cavity 7 and balance the pressures between the cavities 7 and 43. Preferably, the surface of the section of the cavity 7 on a section plane passing through the centreline of the turbomachine, is at least five times greater than the equivalent surface area of the opening 63. In the cavity 7, the air pressure varies from 1 to 25 bars depending on the ambient temperature in the compressor. The internal pressure in the cavity 7 needs to be regulated so as to prevent deformation of adjacent parts to the cavity 7. There is a single opening 63. A second opening in the cover plate 6 would create air circulation between the two openings and would prevent air contained in the cavity 7 from acting as thermal insulation. For example, for an annular cover plate 6 between 0.3 and 2 mm thick, the surface area of the opening section 63 is between 1 and 200 mm$^2$.

The cover plate 6 is preferably installed on the inner arm 52 because this is the part of the shock absorbing ring 5 most exposed to the airflow 43 and most strongly subjected to temperature variations.

Preferably, the lower end 89 of the shock absorbing ring 5 comprises an axial flange 54 and the upstream end 66 of the cover plate 6 comprises an axial flange 64 with the same diameter as the axial flange 54 of the shock absorbing ring 5. The two flanges 54 and 64 are connected together for example using a welding process such as TIG or any other means of obtaining a lasting connection between the elements.

The downstream end 67 of the cover plate 6 is composed of an annular tab 65 that is in simple bearing on the inner face 55 of the stiffener leg 53. The cover plate 6 is thus brought into contact with the stiffener leg 53. The dimensions and thickness of the plate are chosen such that the contact between the two parts is air tight due to the spring effect, for example by making the annular tab 65 with a diameter greater than the diameter of the inner face 55 of the stiffener leg 53.

The thermal insulating layer 8 trapped in the cavity 7 can increase the thermal inertia of the shock absorbing ring 5. The layer of thermal insulation 8 insulates the shock absorbing ring 5 from the airflow 4 and delays the temperature rise of the shock absorbing ring 5. However, this device is not in any way intended to completely insulate the shock absorbing ring 5. The device according to the invention adjusts the thermal inertia of the shock absorbing ring 5 by adjusting the volume of the cavity 7 and the section of the opening 63. The volume of the cavity 7 can be adjusted by bringing the cover plate 6 towards or away from the shock absorbing ring 5. As the volume of the cavity 7 increases, the thermal inertia of the shock absorbing ring 5 also increases. And as the section of the opening 63 increases, the thermal inertia of the shock absorbing ring 5 reduces.

This first embodiment of the invention also has another advantage. Flanges 54 and 64 form a cylinder with length L parallel to the outer shell 92 of the diffuser 9 and to the centreline 208 of the turbomachine. This cylinder with length L is spaced from the outer shell 92 of the diffuser by a radial distance R and thus forms an axial baffle C. The airflow 4 is firstly constrained to a radial flow as it passes through the clearance 42. The airflow 4 is then constrained to flow through a first restriction formed by the axial baffle C between the cylindrical flanges 54 and 64 and the shell 92 before arriving into the cavity 43 between the cover plate 6 and the annular arm 91 of the diffuser 9. The airflow 4 then passes between the stiffener leg 53 and the annular arm 91 of the diffuser 9 that forms a second restriction, before opening up into the cavity 44. The succession of two restrictions followed by two cavities then reduces the velocity of air in contact with the outer casing and reduces heat exchanges between the casings and the airflows 4. However, the cavities 43 and 44 must have a section greater than the baffles in order to limit head losses when the airflow 4 is stopped. The length L is preferably between 0.5 and 5 times the radial distance R. In FIG. 3*a*, the faces 55 and 56 of the stiffener leg 53 are cylindrical, the axis of the cylinder being the axis 200 of the turbomachine.

Figure 3B:
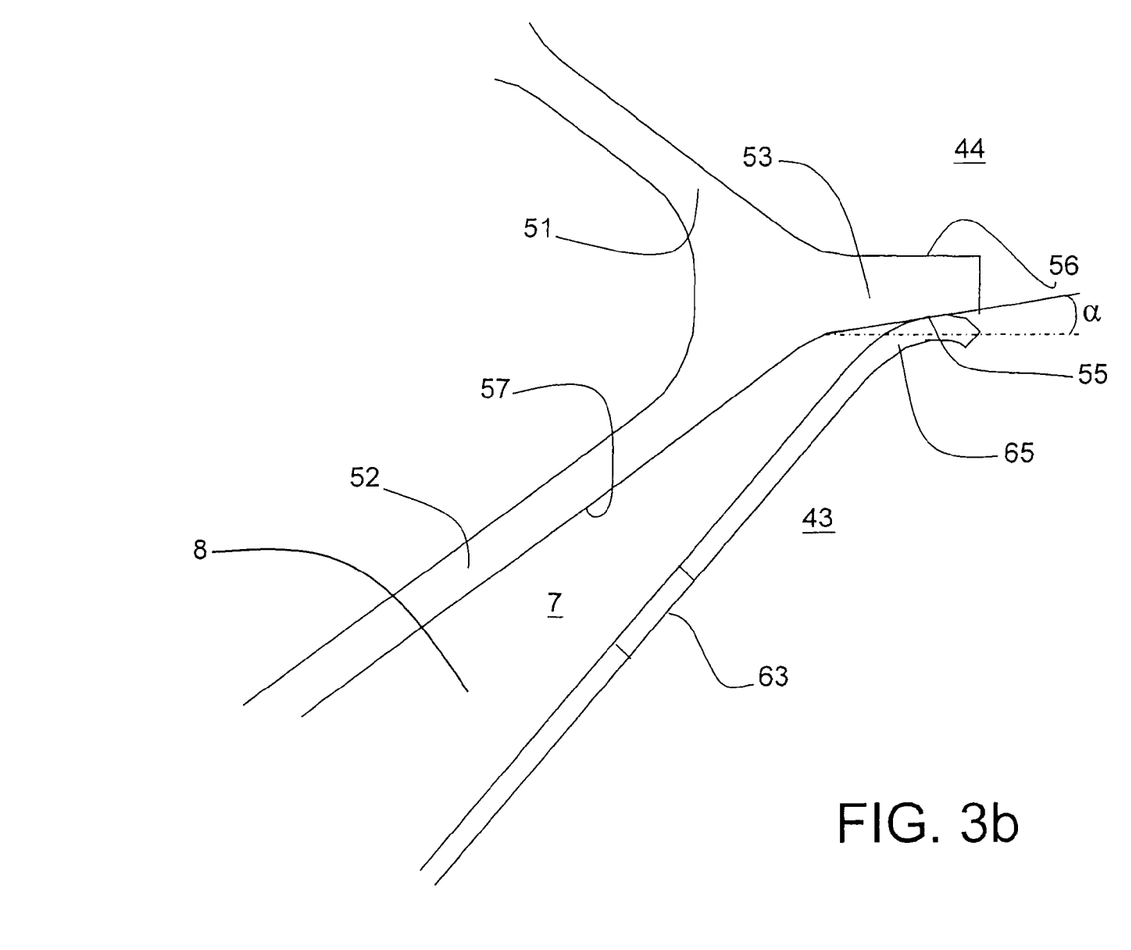
Figure 3C:
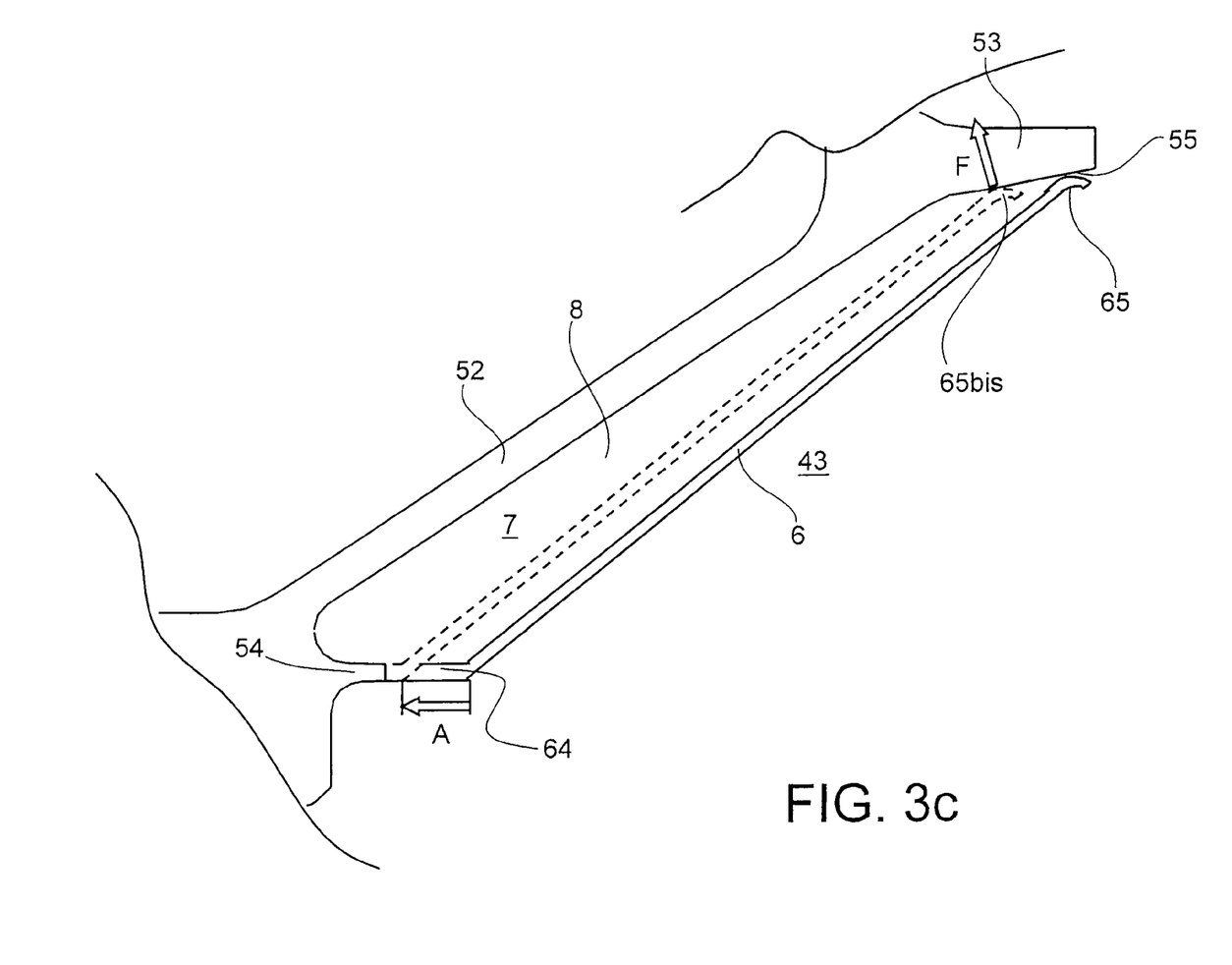

Alternately, in order to guarantee leak tightness between the annular tab 65 and the stiffener leg 53, the inner face 55 of the stiffener leg 53 may be inclined at an angle α from the engine centreline 200 as shown in FIGS. 3*b* and 3*c*. The inner face 55 of the stiffener leg 53 is then a cone, the smallest diameter of which is oriented towards the upstream side of the turbomachine. Preferably, the angle α is between 5° and 15°.

FIG. 3*c* shows how introducing an angle α between the inner face 55 of the stiffener leg 53 and the engine centreline 200 can improve leak tightness between the annular tab 65 and the stiffener leg 53. The cylindrical flange 64 of the cover plate 6 and the cylindrical flange 54 of the shock absorbing ring are for example connected by TIG welding. The cylindrical flange 64 then shrinks by an amount A due to welding. The cover plate 6 and the annular tab 65 then also move by a distance A, the annular tab 64 moving to 65*b*. The annular tab 65 then applies a force F that depends on the angle α and the displacement A, on the inner face 55. Welding the connection between the cylindrical flanges 64 and 54 and the inclination of the inner face 55 guarantee leak tightness of the contact between the annular tab 65 and the stiffener leg 53.

Figure 4:
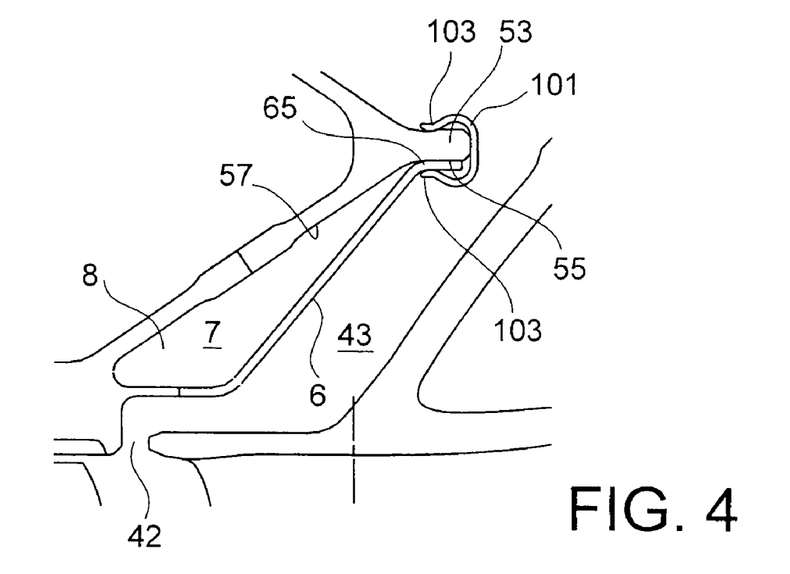
FIGS. 4, 5, 6, show axial sectional views of three variants of the first embodiment of the invention.

FIG. 4 shows a first variant of the first embodiment of the thermal inertia control device according to the invention.

The cover plate 6 is in contact with the stiffener leg 53 such that the contact is leak tight. Contact between the annular tab 65 and the stiffener leg 53 is maintained by a retention clip 101. The retention clip 101 is an elastic annular metallic section with a constant omega (Ω) shaped section. The two tabs 103 of the retention clip 101 close naturally by elasticity, consequently the clip maintains permanent contact between the cover plate 6 and the inner face 55 of the stiffener 53.

Figure 5:
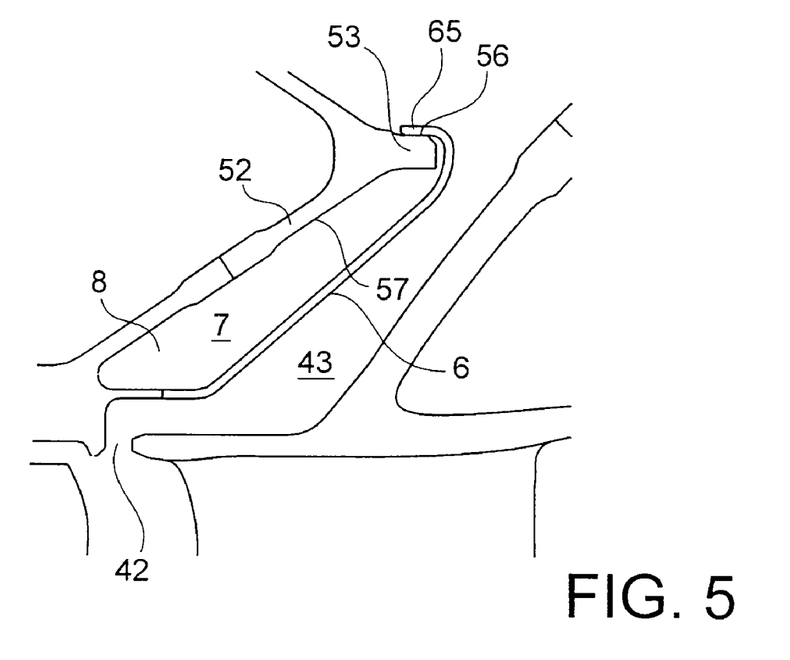

FIG. 5 shows a second variant of the first embodiment of the thermal inertia control device according to the invention.

According to this variant, the downstream end of the cover plate 6 is curved towards the upstream side of the compressor and is prolonged by an annular tab 65 bearing on the outer face 56 of the stiffener leg 53. The thermal expansions of the shock absorbing ring 5 and the cover plate 6 tend to tight the cover plate 6 in contact with the inner surface of the shock absorbing ring 5 and to maintain it in contact with the outer face 56 of the stiffener leg 53.

Figure 6:
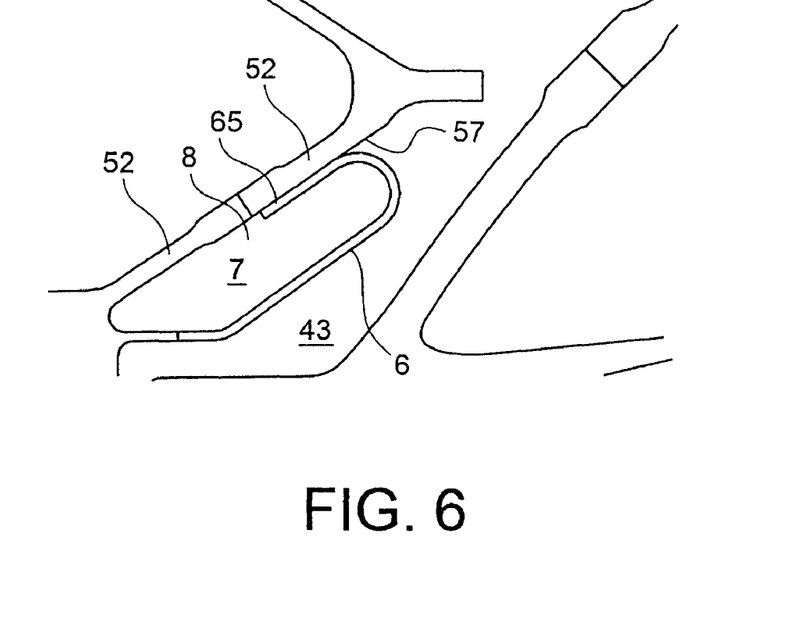

FIG. 6 shows a third variant of the first embodiment of the thermal inertia control device according to the invention. The annular tab 65 of the cover plate 6 is curved towards the inside of the cavity 7 so as to form a U that bears on the inner surface 57 of the inner arm 52. The dimensions and thickness of the plate are chosen such that the contact between the two parts is airtight as a result of a spring effect.

Figure 7:
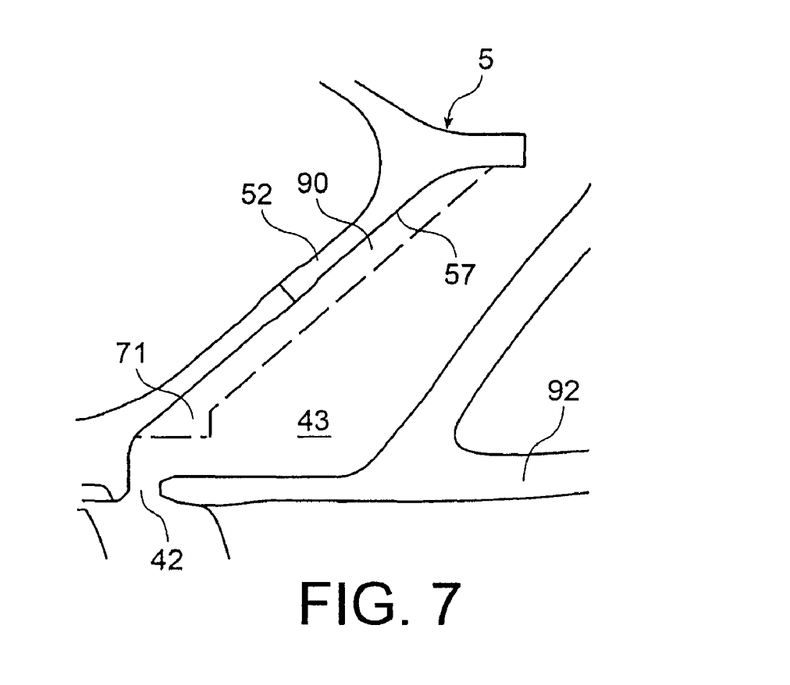
FIG. 7 shows an axial sectional view of a second embodiment of the invention.

FIG. 7 shows a second embodiment of the thermal inertia control device according to the invention. A layer of thermal insulation 90 is deposited on the inner surface 57 of the inner arm 52 of the shock absorbing ring 5. This insulation layer comprises a cylindrical upstream end 71 parallel to the axis of the compressor and parallel to the outer shell 92 of the diffuser 9. The layer of thermal insulation may be composed of a polyurethane foam composed of alumina and silica like that used as an abradable material to create leak tightness between the mobile blades 10 and the fixed shells 23 facing them. The layer of thermal insulation is preferably deposited by plasma spraying and then machined to form the desired shape using processes known to those skilled in the art. Preferably, the insulating layer is deposited in a uniform and regular layer with a thickness of between 0.5 and 4 mm.

The device to improve radial clearances according to the different embodiments of the invention can easily be adapted to existing turbomachines, particularly due to the different bonding solutions of the cover plate on the shock absorbing ring of the first embodiment of the invention and due to the second embodiment.

This device can also significantly reduce the tangential airflow rate drawn off from the immediate environment of the shock absorbing ring.

The different possibilities for implementation of the device according to the invention are such that it could be applied to any part of the turbomachine in which there is a similar technical problem. For example, such a device to improve radial clearances can be fitted in a high or low pressure turbine module comprising an outer casing and an inner casing connected through a part with a small mass in contact with an airflow.

The invention claimed is:

1. Turbomachine module comprising a device to improve radial clearances, comprising an outer casing (22), an inner casing (21) through which a primary turbomachine flow (Fp) passes, and at least one shock absorbing ring (5) connecting said casings, said module also comprising an annular cavity (43) on the downstream side of said shock absorbing ring (5), with a passage (42) formed in it through which an airflow (4) is drawn off from said primary flow (Fp), characterised in that the device to improve radial clearances comprises a thermal inertia control device mounted on the shock absorbing ring (5), downstream from it, this thermal inertia control device comprising at least one coat of thermal insulation (8, 90), and at least partly delimiting said annular cavity (43), on the downstream side of it.

2. Turbomachine comprising at least one module according to claim 1.

3. Turbomachine module according to clam 1, characterised in that the coat of thermal insulation is a thermal layer (90) deposited on the inner surface (57) of the inner arm (52) of the shock absorbing ring (5).

4. Turbomachine module according to claim 3, characterised in that the thermal layer (90) is an abradable material.

5. Turbomachine module according to claim 1, characterised in that the coat of thermal insulation (8, 90) is in contact with an inner surface (57) of an annular arm (52) inside the shock absorbing ring (5).

6. Turbomachine module according to claim 5, characterised in that the thermal insulation is chosen from among the following materials: air, glass fibre, silica wool felt.

7. Turbomachine module according to claim 5, characterised in that the thermal inertia control device also comprises a cover plate (6) mounted on the annular arm (52) inside the shock absorbing ring (5) and a cavity (7) located between the cover plate (6) and the inner arm (52), and in that the layer of thermal insulation (8, 90) is housed in the cavity (7).

8. Turbomachine module according to claim 7, characterised in that the cover plate (6) comprises a single opening (63) opening up in the cavity (7).

9. Turbomachine module according to claim 7, characterised in that the shock absorbing ring (5) also comprises a cylindrical stiffener leg (53) extending the inner annular arm (52) and in that the cover plate (6) comprises:

an upstream end (66) connected to a lower end (89) of the shock absorbing ring (5); and a downstream end (67) connected to the cylindrical stiffener leg (53).

10. Turbomachine module according to claim 9, characterised in that the downstream end (67) of the cover plate (6) comprises an annular tab (65) bearing on an outer face (56) of the stiffener leg (53).

11. Turbomachine module according to claim 9, characterised in that the downstream end (67) of the cover plate (6) comprises an annular tab (65) forming a U curved towards the inside of the cavity (7), and bearing on the inner arm (52).

12. Turbomachine module according to claim 9, characterised in that the downstream end (67) of the cover plate (6) comprises an annular tab (65) bearing on an inner face (55) of the stiffener leg (53).

13. Turbomachine module according to claim 12, characterised in that the inner face (55) of the stiffener leg (53) forms an angle ($\alpha$) with the centreline of the turbomachine (200), the value of which is between 5° and 15°.

14. Turbomachine module according to claim 12, characterised in that it also comprises a retention clip (101) holding the annular tab (65) of the cover plate (6) on the inner face (55) of the stiffener leg (53).

* * * * *